United States Patent [19]
Mohan

[11] Patent Number: 5,818,126
[45] Date of Patent: Oct. 6, 1998

[54] POWER TRANSFER CONTROLLER

[75] Inventor: Ned Mohan, St. Paul, Minn.

[73] Assignee: Regents of the University of Minnesota, Minneapolis, Minn.

[21] Appl. No.: 810,621

[22] Filed: Feb. 28, 1997

Related U.S. Application Data

[63] Continuation-in-part of Ser. No. 720,575, Oct. 2, 1996, abandoned.

[51] Int. Cl.$^6$ .................................................. H02J 3/18
[52] U.S. Cl. ........................... 307/85; 323/208; 323/210; 323/215; 323/342; 363/39
[58] Field of Search .................. 307/85, 7, 151; 323/208, 209, 210, 342, 207, 215; 363/39

[56] References Cited

U.S. PATENT DOCUMENTS

| | | | |
|---|---|---|---|
| 946,829 | 1/1910 | Stanley | 307/7 |
| 2,329,229 | 1/1943 | Palley | 307/151 |
| 3,690,739 | 9/1972 | Prescott | 323/342 |
| 3,963,978 | 6/1976 | Kelly et al. | 323/210 |
| 4,490,769 | 12/1984 | Boenig | 361/58 |
| 5,198,746 | 3/1993 | Gyugyi et al. | 363/39 |
| 5,461,300 | 10/1995 | Kappenman | 323/215 |
| 5,469,044 | 11/1995 | Gyugyi et al. | 323/215 |
| 5,610,501 | 3/1997 | Nelson et al. | 323/207 |

OTHER PUBLICATIONS

Gyugyi, L., "Solid–State Synchronous Voltage Sources for Dynamic Compensation and Real–Time Control of AC Transmission Lines", IEEE Standards Press, (1993).

Final Report: "Flexible AC Transmission Systems (FACTS)—Hardware Feasibility Study of a Minnesota Power 150 MVA, 115 kV Thyristor Controlled Phase Angle Regulating Transformer, (TCPAR)", Electric Power Research Institute, pp. 1–1–702 (Oct. 22, 1993).

2763–1 Final Report: "Study of Improved Load-–Tap–Changing for Transformers and Phase–Angle Regulators", Electric Power Research Institute, (Nov. 1988).

Primary Examiner—Fritz Fleming
Assistant Examiner—Albert W. Paladini
Attorney, Agent, or Firm—Westman, Champlin & Kelly, P.A.; S. Koehler

[57] ABSTRACT

A method and apparatus for controlling power transferred and regulating voltage in a multi-phase transmission line includes generating a first plurality of voltages, a second plurality of voltages displaced in phase from the first plurality of voltages, and a third plurality of voltages displaced in phase from the first and second plurality of voltages. The first, second and third plurality of voltages are selectively connected in series in each line of the multi-phase transmission line.

25 Claims, 10 Drawing Sheets

Fig. 13

POWER TRANSFER CONTROLLER

CROSS REFERENCE TO RELATED APPLICATION

This application is a continuation-in-part of application Ser. No. 08/720,575, filed Oct. 2, 1996, now abandoned.

BACKGROUND OF THE INVENTION

The present invention relates to controlling power through a multi-phase transmission line. More particularly, the present invention injects a voltage in series, having a selected phase and magnitude in each line of the transmission line to control power flow.

Power flow on a transmission line is given by the following well-known equation:

$$P = \frac{E_1 E_2}{X} \sin\delta \qquad \text{EQ. 1}$$

where $E_1$ and $E_2$ are the magnitudes of the bus voltages at the two ends of the transmission line, X is the reactance of the transmission line, and $\delta$ is the angle between the two bus voltages. From Eq. 1, it is clear that power flow can be adjusted by changing (1) The voltage magnitudes $E_1$ and $E_2$, (2) the reactance of the transmission line, or (3) the angle $\delta$ between the two bus voltages.

Various devices have been advanced to control one or more of the above-identified quantities in order to control power flow through the transmission line. For example, shunt-connected devices such as Thyristor-Controlled Reactors (TCR), Thyristor-Switched Capacitors (TSC) and Static Var Compensators (STATCOM). These devices draw reactive power from a bus, thereby causing the bus voltage to change due to an internal system reactance.

Although reactive power compensation is very important and may even be necessary at high loadings to avoid voltage collapse, this approach has a number of disadvantages for controlling the flow of active power. Specifically, a large amount of reactive power compensation, depending on the system and the internal reactance, may be required to change the voltage magnitude. In addition, changes in voltage can only be performed in a limited range about the nominal voltage of the transmission line. Secondly, most electric transmission systems include a number of parallel paths of transmission lines, which form loops. If the magnitude of the voltage at a given bus is changed in order to obtain a desired power flow through a given transmission line, the change in voltage magnitude will also change the power flow for all other transmission lines connected to the bus.

Series connected devices such as Thyristor-Controlled Series Capacitor (TCSC) and Thyristor-Switched Series Capacitors (TSSC) are also known. These devices are connected in series with the transmission line to change or neutralize the transmission line reactance. These devices are generally not very effective at small values of the power angle $\delta$.

Phase-shifting transformers are also known and regulate power flow by changing the power angle $\delta$ in equation 1. The phase-shifting transformer injects a voltage in series in each of the lines of the transmission line that is, by design, in quadrature with the line to neutral terminal voltage. The phase-shifting transformer typically includes a primary set of windings connected to the transmission line. Non-identical secondary windings are provided for each phase of the set of primary windings. The non-identical transformer windings all have the same phase and are reversibly connected in series or bypassed in series in each of the transmission lines to provide the injected voltage.

Since the phase-shifting transformer, by design, only injects a voltage in quadrature with the line to neutral terminal voltage, only the power angle $\delta$ can be changed.

Recently, a device called the Universal Power Flow Controller (UPFC) has been advanced and can change the power flow in a transmission line in any of the combination of ways listed above. Generally, the UPFC injects a voltage having a selected phase angle and magnitude with respect to the terminal voltage at one end of the UPFC in order to obtain the desired terminal voltage at the other end of the UPFC. The UPFC includes two voltage-source switch-mode converters. A first converter injects the voltage in series in each of the transmission lines. The second converter is needed because the first converter can absorb or deliver real and reactive power based on the line current and voltage injected. Since there is no steady state energy storage capability within the UPFC, the second converter must balance the power equation in order to conserve real power. Although the UPFC is quite flexible, it is also expensive to construct. Two switch-mode converters are required. Commonly, the converters consist of GTO-type devices or IGBT-type devices, switching at a relatively high frequency compared to the line frequency. These devices result in switching power losses and electromagnetic interference. In addition, two relatively large transformers are needed, each with the same VA rating as the converters. One transformer is required to inject the voltage produced by the first converter in series with the transmission lines. The other transformer is needed to interconnect the second converter to the transmission system. The two transformers represent a significant cost of the UPFC and provide additional power losses.

Some of the above-described techniques for controlling power flow in a transmission line are described in detail in "Solid-State Synchronous Voltage Sources for Dynamic Compensation and Real-Time-Control of AC Transmission Lines" by Gyugyi, L., published by IEEE Standards Press, 1993.

SUMMARY OF THE INVENTION

A method and apparatus for controlling power transferred and regulating voltage in a multi-phase transmission line includes generating a first plurality of voltages, a second plurality of voltages displaced in phase from the first plurality of voltages, and a third plurality of voltages displaced in phase from the first and second plurality of voltages. The first, second and third plurality of voltages are selectively connected in series in each line of the multi-phase transmission line.

In a preferred embodiment, a multi-phase power transfer controller includes a set of primary windings comprising a first primary winding connectable to a first line of the multi-phase transmission line; a second primary winding connectable to a second line of the multi-phase transmission line; and a third primary winding connectable to a third line of the multi-phase transmission line.

A second set of secondary windings are magnetically coupled to the set of primary windings. The set of secondary windings includes a first plurality of secondary windings connectable in series with a first line of the multi-phase transmission line; a second plurality of secondary windings connectable in series with a second line of the multi-phase transmission line; and a third plurality of secondary windings connectable in series with a third line of the multi-phase transmission line. Each plurality of secondary windings comprises a first secondary winding magnetically linked to the first primary winding; a second secondary winding magnetically linked to the second primary winding; and a third secondary winding magnetically linked to the third primary winding.

The multi-phase power transfer controller further includes a switching assembly for selectively connecting the secondary windings of each plurality of secondary windings in series in each corresponding transmission line. As used herein, "selectively connecting" is not limited to connecting only a single secondary winding, or injecting only a single voltage in series in the transmission line, nor that all of the secondary windings of the plurality, or all of the voltages are connected in series in the transmission line, but rather, that any combination of one or more secondary windings of the plurality, or voltages, can be connected in series in the transmission line. For example, the switching assembly can selectively connect a non-equal number of secondary windings of each plurality of secondary windings in series in each corresponding line of the multi-phase transmission line to provide individual voltage regulation between the phases, or an equal number of secondary windings of each plurality of secondary windings in series in each corresponding line of the multi-phase transmission line to provide a balanced set of injected voltages.

DETAILED DESCRIPTION OF THE PREFERRED EMBODIMENTS

Figure 1:
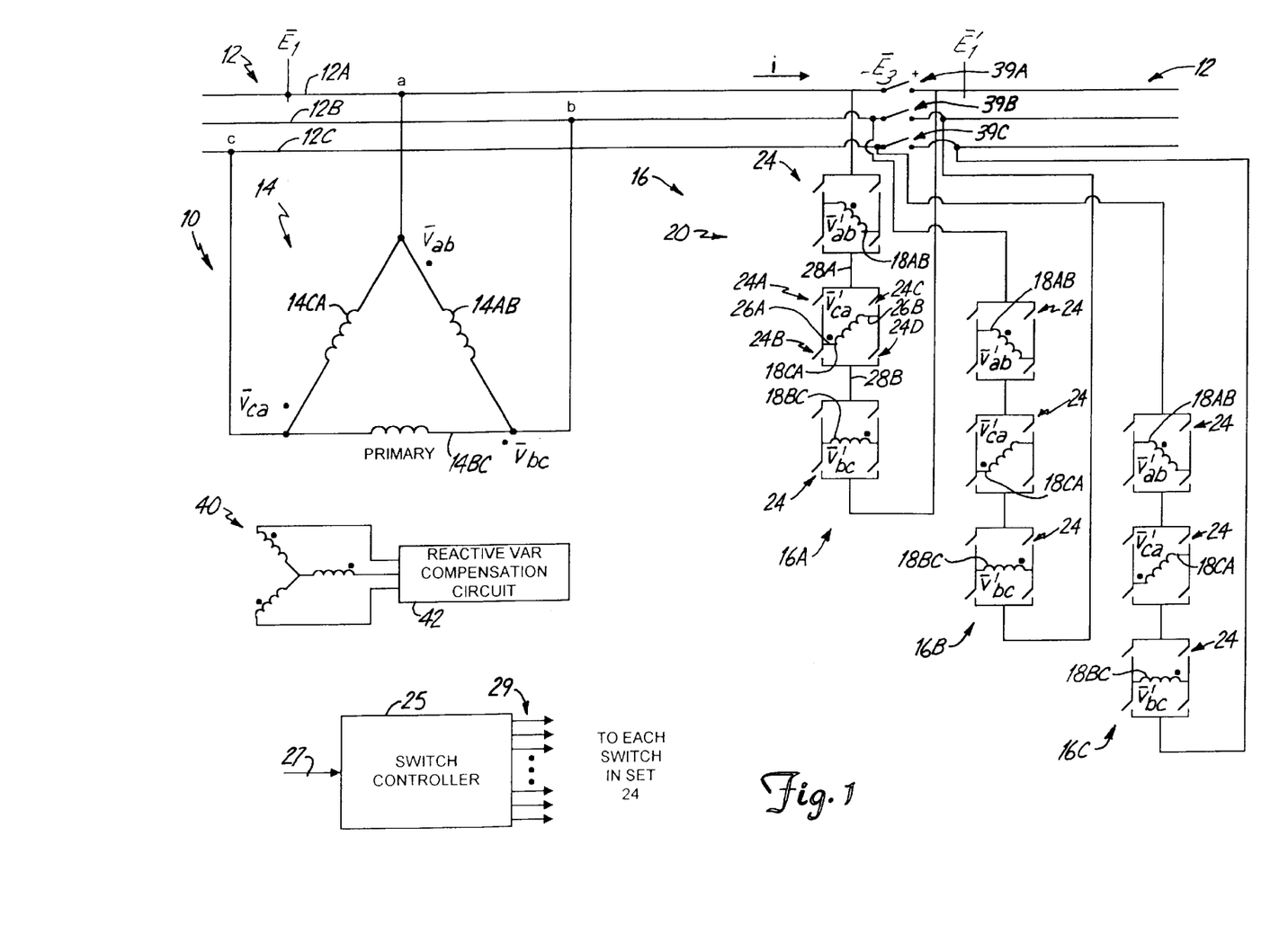
FIG. 1 is a three-phase line diagram of a first embodiment of the present invention.

A power transfer controller of the present invention is indicated at 10 in FIG. 1. Embodied herein for use on a three-phase transmission line indicated at 12, the power transfer controller 10 injects a voltage $E_3$ at a selected phase angle and magnitude to control power flow through the transmission line 12.

Generally, the power transfer controller 10 includes a set of primary windings 14 operably connected to the transmission line 12. In the embodiment illustrated, the primary windings 14 are connected in a delta configuration wherein a first primary winding 14AB is connected across transmission line conductors 12A and 12B, a second primary winding 14BC is connected across transmission line conductors 12B and 12C, and a third primary winding 14CA is connected across the transmission line conductors 12C and 12A.

A set of secondary windings generally indicated at 16 are magnetically linked to the set of primary windings 14. The set of secondary windings 16 comprise a first plurality of secondary windings 16A connectable in series with the transmission line conductor 12A, a second plurality of secondary windings 16B connectable in series with the transmission line conductor 12B, and a third plurality of secondary winding 16C connectable in series with the transmission line conductor 12C. Each plurality of secondary windings 16A–16C comprises a first secondary winding 18AB magnetically linked to the first primary winding 14AB, a second secondary winding 18BC magnetically linked to the second primary winding 14BC and a third secondary winding 18CA magnetically linked to the third primary winding 14CA. A switching assembly generally indicated at 20 selectively connects the secondary windings 18AB, 18BC, 18CA of each plurality of secondary windings 16A–16C in series in each corresponding transmission line conductor 12A–12C in order to inject the desired voltage to control power transferred through the transmission line 12. In other words, the power transfer controller 10 controls power flow by injecting a portion of the primary voltages, by means of the secondary windings 16, in series with the phase voltages such that $E_1+E_3=E_1'$.

Figure 2:
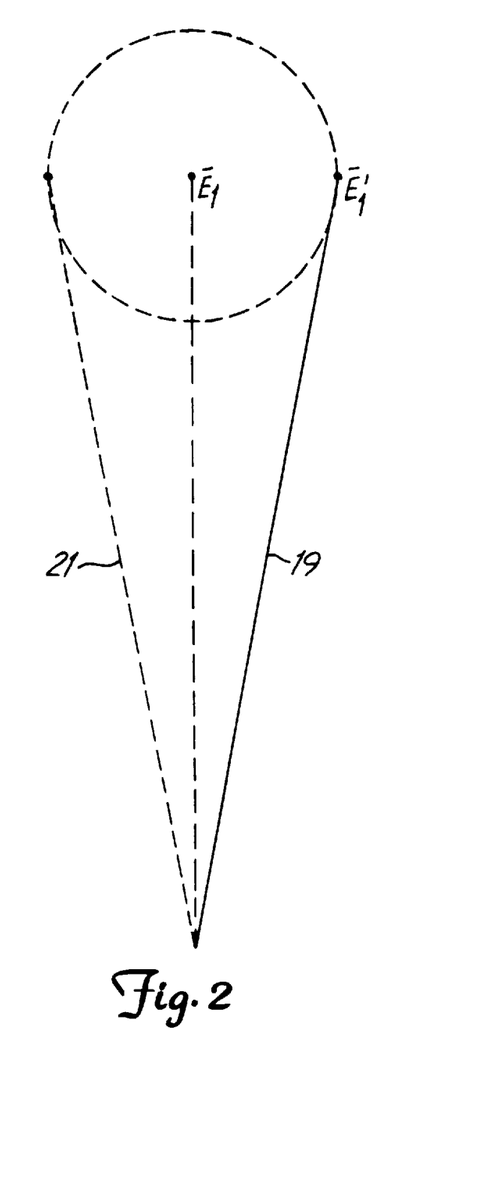
FIG. 2 is a graphical representation of a leading and lagging voltage.

Preferably, the switching assembly 20 allows each of the secondary windings 18AB, 18BC, and 18CA to be selectively connected in series in each corresponding transmission line conductor 12A–12C either "in forward polarity" or "in reverse polarity" with each corresponding primary winding 14AB, 14BC, and 14CA. For example, if only the secondary winding 18BC of the first plurality of secondary winding 16A was connected in series with a forward polarity in transmission line conductor 12A, and only the secondary winding 18CA of the plurality of secondary winding 16B was connected in series with a forward polarity in transmission line conductor 12B, and only the secondary winding 18AB of the plurality of secondary winding 16C was connected in series with a forward polarity in the transmission line conductor 12C, then a leading resultant balanced set of voltages $E_1'$ would be generated in each conductor, as illustrated with dashed arrow 21 in FIG. 2. In contrast, if only the secondary winding 18BC of the first plurality of secondary winding 16A was connected in series with a reverse polarity in transmission line conductor 12A, and only the secondary winding 18CA of the plurality of secondary winding 16B was connected in series with a reverse polarity in transmission line conductor 12B, and only the secondary winding 18AB of the plurality of secondary winding 16C was connected in series with a reverse polarity in the transmission line conductor 12C, then a lagging resultant balanced set of voltages $E_1'$ would be generated in each conductor, as illustrated with arrow 19 in FIG. 2. Normal dot convention is provided for the windings 14AB, 14BC, 14CA, 18AB, 18BC and 18CA as illustrated in FIG. 1.

In the embodiment illustrated a set of four switching devices 24 are provided for each secondary winding 18AB, 18BC and 18CA, in order to selectively bypass or connect each secondary winding 18AB, 18BC and 18CA in forward or reverse polarity in the transmission line conductors 12A–12C. Referring to secondary winding 18CA of the first plurality of secondary winding 16A by way of example, switching devices 24A, 24B, 24C and 24D are provided. The switching device 24A selectively connects a first end 26A of the secondary winding 18CA to a first end 28A of the transmission line conductor 12A. The switching device 24B selectively connects the first end 26A to a second end 28B of the transmission line conductor 12A. The switching device 24C selectively connects a second end 26B of the secondary winding 18CA to the first end 28A of the transmission line conductor 12A. The switching device 24D selectively connects the second end 26B of the secondary winding 18CA to the second end 28B of the transmission line conductor 12A. (For this portion of the description, the first end of the transmission line conductor 12A is considered at 28A, while the second end of the transmission line conductor 12A is considered at 28B. The secondary windings 18AB and 18BC of the first plurality 16A can either be considered a part of the transmission line conductor 12A, if connected, or bypassed, if not connected.)

The secondary winding 18CA can be connected in series in the transmission line conductor 12A either by closing the switching devices 24A and 24D with the switching devices 24B and 24C open (forward polarity), or closing the switching devices 24B and 24C with the switching devices 24A and 24D open (reverse polarity). If it is desired that the secondary winding 18CA should not be connected in series in the transmission line conductor 12A, then either the switching devices 24A and 24B are closed with the switching devices 24C and 24D open, or the switching devices 24C and 24D are closed with the switching devices 24A and 24B open. In this manner, one end of the secondary winding 18CA is electrically isolated (floating) while current in the transmission line conductor 12A bypasses the secondary winding 18CA. Each of the secondary windings 18AB, 18BC and 18CA includes a set of four switching devices 24 that operate identical to the switching devices 24A–24D described above in order to selectively connect the corresponding secondary winding in each corresponding transmission line conductor 12A, 12B or 12C. A switching device controller 25 receives an input signal 27 indicating a desired voltage $E_3$ of selected phase and magnitude to be injected in series in each of the transmission line conductors 12A–12C. The switching controller 25 operates each of the switching devices 24 through control signals 29 to selectively connect the secondary windings 18AB, 18BC and 18CA in each of the pluralities 16A–16C to obtain the desired voltage $E_3$.

Figure 3:
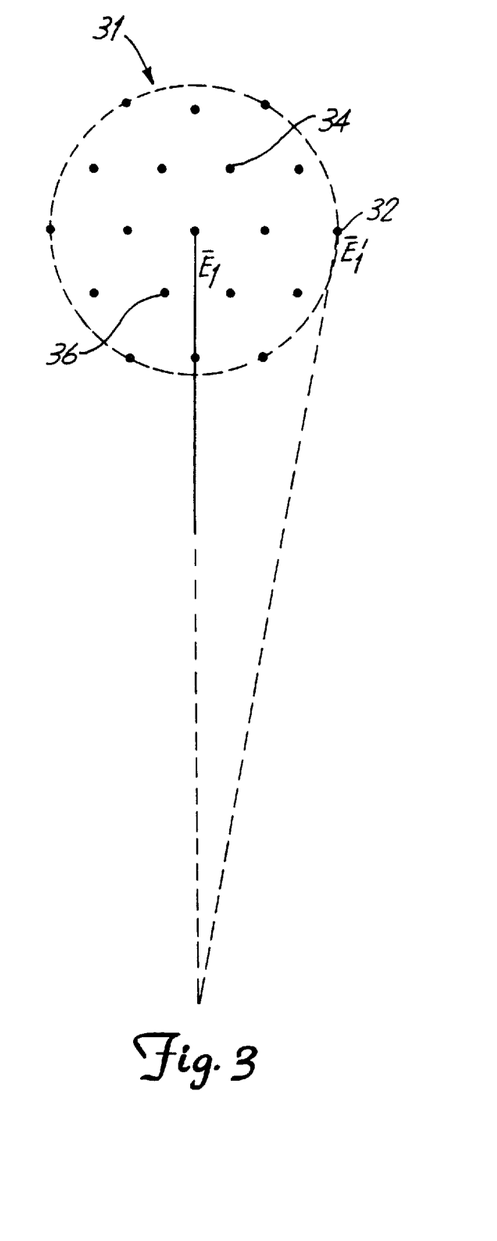
FIG. 3 is a graphical illustration of operating points available with the present invention.

By selectively connecting the secondary windings 18AB, 18BC and 18CA, the magnitude and phase relationship of $E_1'$ with respect to $E_1$ can be adjusted in discrete vector quantities. FIG. 3 graphically illustrates various operating points 31 that $E_1'$ can obtain by selectively connecting the secondary windings 18AB, 18BC and 18CA in the transmission line conductors 12A–12C. For example, $E_1'$ can operate at operating point 32 for the line conductor 12A if the winding 18BC of the first plurality 16A is connected in reverse polarity, the secondary winding 18AB of the first plurality 16A is connected in forward polarity and the secondary winding 18CA of the first plurality 16A is connected in forward polarity in the transmission line conductor 12A. In a second example, $E_1'$ can operate at operating point 34 for the line conductor 12A if the winding 18AB of the first plurality 16A is bypassed, the secondary winding 18BC of the first plurality 16A is bypassed and the secondary winding 18CA of the first plurality 16A is connected in forward polarity in the transmission line conductor 12A. In a third example, $E_1'$ can operate at operating point 36 for the line conductor 12A if the winding 18AB of the first plurality 16A is bypassed, the secondary winding 18BC of the first plurality 16A is bypassed and the secondary winding 18CA of the first plurality 16A is connected in reverse polarity in the transmission line conductor 12A. Each of the remaining operating points 31 can be obtained by selectively connecting the secondary windings 18AB, 18BC and 18CA in series with the transmission line conductor 12A. Preferably, the secondary windings 18AB, 18BC and 18CA of the second and third pluralities 16B and 16C are switched in accordance with the secondary windings 18AB, 18BC and 18CA of the first plurality 16A such that a balanced three-phase injected voltage is provided in the transmission line 12.

Figure 4:
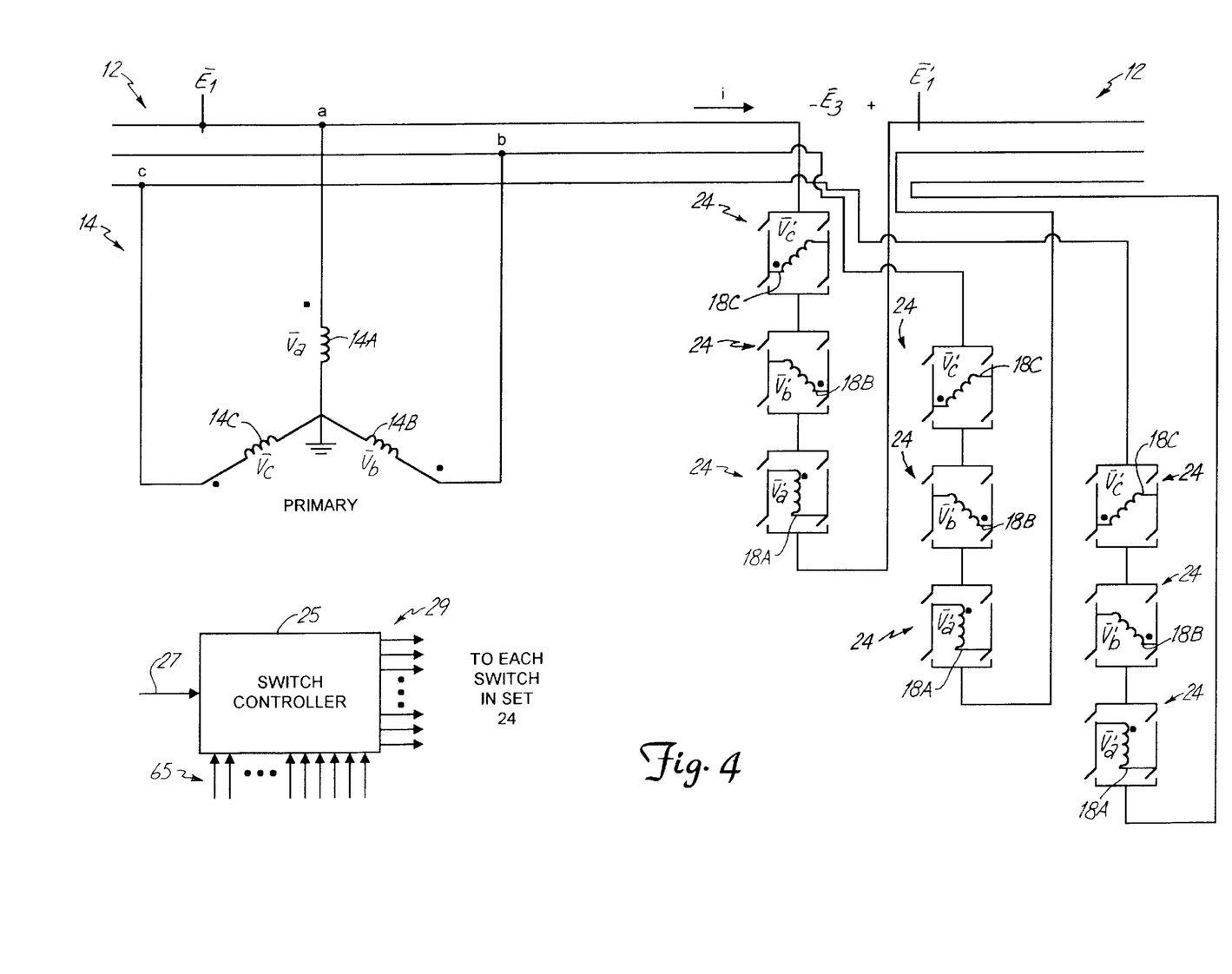
FIG. 4 is a circuit diagram of a second embodiment of the present invention.

Although illustrated in FIG. 1 as a delta configuration, it should be understood that the set of primary windings 14 can also be connected in a grounded-wye configuration, as illustrated in FIG. 4. In this embodiment, the set of primary windings 14 include windings 14A, 14B and 14C that are magnetically coupled to secondary windings 18A, 18B and 18C. Switch controller 25 operates each of the switching devices 24 through control signals 29 to selectively connect the secondary windings 18A, 18B and 18C in each of the pluralities 16A–16C to obtain the desired voltage to inject in each conductor of the transmission line 12.

The present invention is well suited for regulating the voltage on each of the conductors 12A–12C, individually. In this manner, the present invention provides both a method and an apparatus to control the voltage on one or more of the phases in the event the voltages present on those phases depart from nominal values. For instance, if a single-line to ground fault were to occur on conductor 12A such that the voltage thereon is lower than nominal value, while the other conductors 12B and 12C are close to nominal values, the switch controller 25 can provide suitable control signals to the switching devices 24 of the plurality of secondary winding 16A in order to inject a suitable voltage in series with the voltage present on conductor 12A such that the voltage returns approximately to the nominal value. If necessary, the switch controller 25 can provide control signals to the switching devices 24 of the plurality of secondary windings 16B and 16C in order to inject voltages in series with the conductors 12B and 12C, respectively, to return the voltage on these conductors also to nominal values.

When used only as a means to regulate the voltage on each of the conductors 12A–12C in the case of departure of the voltages from nominal values, each of the switching devices 24 for the secondary windings 16 can be configured such that the secondary winding 16 is electrically isolated or floats, as described above. Alternatively, switches 39A, 39B and 39C can be inserted in the conductors 12A–12C as illustrated in FIG. 1. Under normal operating conditions, the switches 39A–39C are closed thereby bypassing each the plurality of secondary windings 16A–16C. When it becomes necessary to regulate the voltage on any of the conductors 12A, 12B or 12C, the switch controller 25 provides suitable command signals to open the switches 39A–39C as necessary to allow the plurality of secondary windings 16A–16C to be inserted therein with operation of the corresponding switching devices 24.

Figure 5:
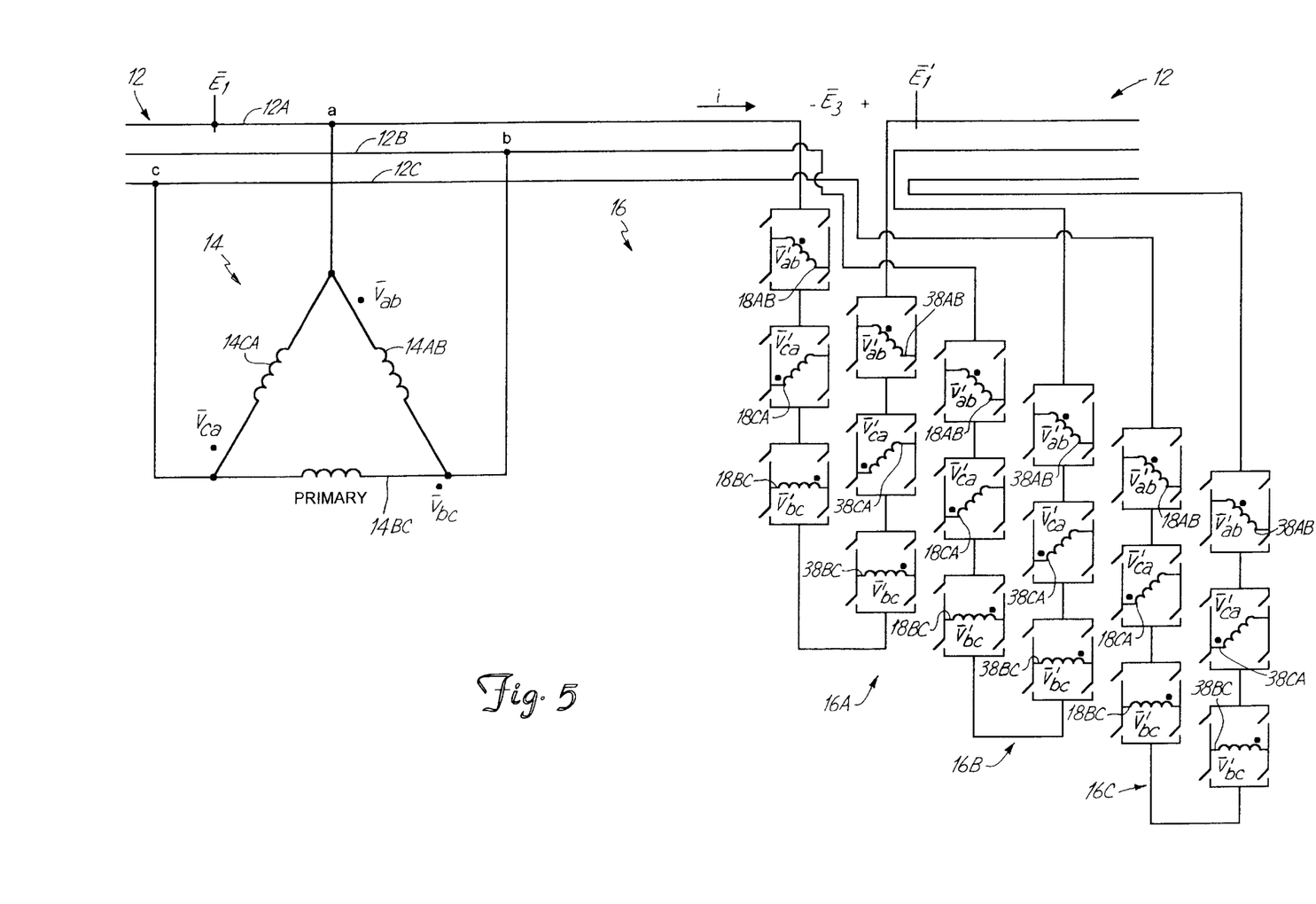
FIG. 5 is a circuit diagram of a third embodiment of the present invention.
Figure 6:
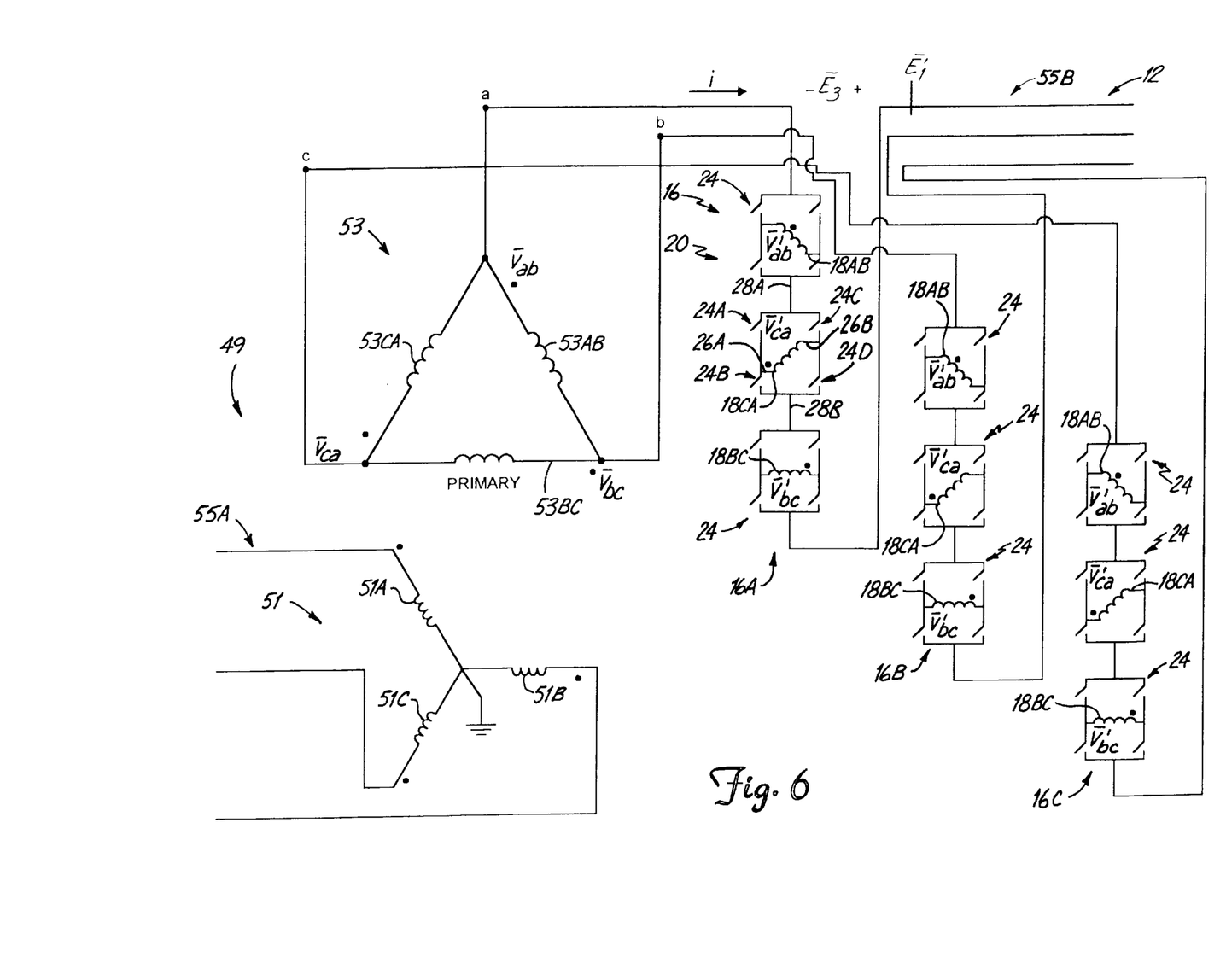
FIG. 6 is a circuit diagram of a fourth embodiment of the present invention.

Another embodiment of the present invention is illustrated in FIG. 6 wherein the multi-phase transmission line 12 includes a transformer 49 having a primary set of windings 51 and a secondary set of windings 53. The transformer 49 transforms electrical power at a first voltage level on portion 55A of the transmission line 12 at a first voltage level to a second voltage level on a portion 55B of the transmission line 12. In this embodiment, each winding of the set of primary windings 51 is magnetically coupled to a corresponding winding of the set of secondary windings 53 as well as a winding of each of the plurality of secondary windings 16A–16C. For example, winding 51B is magnetically coupled to winding 53BC and each winding 18BC of the plurality of secondary windings 16A–16C. The switching devices 24 can be controlled so as to provide individual voltage regulation for each of the conductors 12A, 12B or 12C, and/or balanced three phase load regulation wherein an equal number of secondary windings of each of the plurality of secondary windings 16A–16C are connected in series in each corresponding line 12A, 12B and 12C, respectively. A significant advantage of the embodiment of FIG. 5 is that a separate exciter winding is not needed since the secondary windings 16 are magnetically coupled to the primary windings 51. Although illustrated wherein the transformer 49 comprises primary windings 51 connected in a grounded wye configuration and the secondary windings 53 connected in a delta configuration, other configurations are possible. For instance, the transformer 49 can be a grounded wye-grounded wye transformer, a delta-grounded wye transformer, or a delta-delta transformer.

In a further embodiment illustrated in FIG. 5, each plurality of secondary windings 16A–16C includes additional secondary windings 38AB, 38BC and 38CA that can be selectively connected in series in the corresponding transmission line conductors 12A–12C. Preferably, the secondary windings 38A, 38B and 38C have a different number of turns then present in the secondary windings 18AB, 18BC and 18CA so that the magnitude of the injected voltage from the secondary windings 38A, 38B and 38C is different than the magnitude of the voltage from the secondary windings 18AB, 18BC and 18CA although the phase is the same. In this manner, more operating points 31 are provided for $E_1'$ in FIG. 3. If desired, even more secondary windings can be added to the plurality of secondary windings 16A–16C to further increase the number of operating points 31 for $E_1'$ in FIG. 3.

Referring back to FIG. 1, reactive var compensation can be provided through another set of secondary windings 40 that are magnetically coupled to the first set of primary windings 16. A reactive var compensation circuit 42 is operably connected to the set of secondary windings 40 and can include any combination of the following known compensation devices: thyristor-switched capacitors, thyristor-controlled reactors, a switch-mode reactive var compensator, passive filters or active filters.

Figure 7:
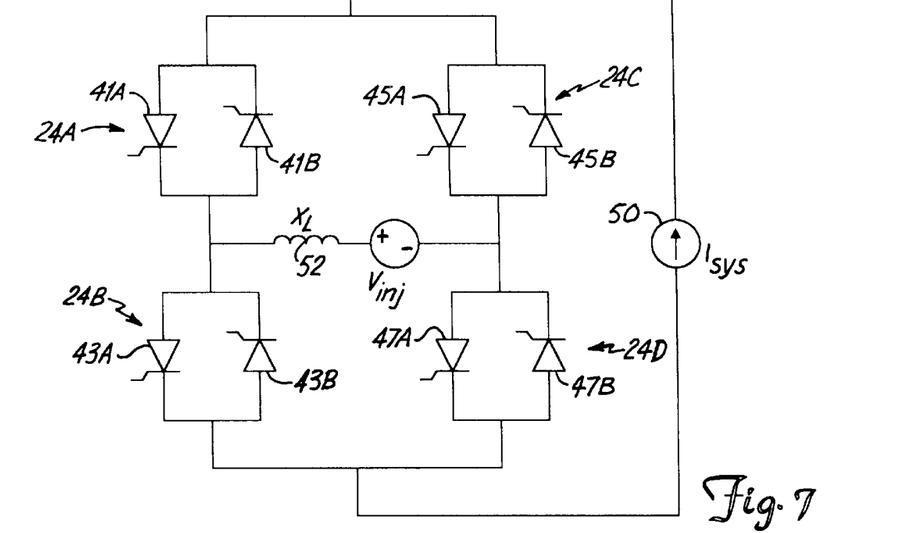
FIG. 7 is an equivalent circuit of one secondary winding.

The switching devices 24 used to selectively connect the secondary windings 18AB, 18BC and 18CA can be any suitable electronic power flow switching element. Anti-parallel thyristors as illustrated in FIG. 7 are well suited to perform the switching operations of the switching devices 24 since thyristors can handle high power levels, are less expensive than other forms of electronic power switching elements, and can be controlled easily. It should be understood that although illustrated in FIGS. 7 and 9–12, wherein each switching device 24 comprises two anti-parallel thyristors, multiple series-connected thyristors are typically required in order to handle the injected voltage $v_{inj}$. As is known in the art, multiple series-connected thyristors can be operated or "gated" simultaneously; and therefore, can be represented in FIGS. 7 and 9–12 as two anti-parallel thyristors. In the embodiment illustrated, the switching devices 24A–24D comprise anti-parallel thyristors indicated at 41A, 41B, 43A, 43B, 45A, 45B, 47A and 47B ("41A–47B").

FIG. 7 illustrates an equivalent circuit for the secondary winding 18CA where $v_{inj}$ is the voltage of the secondary winding 18CA which needs to be either inserted (forward or reverse polarity) or bypassed in the transmission line conductor 12A. A current source 50 represents the current $i_{sys}$ flowing through the transmission line conductor 12A and depends on the interaction of the power system at $E_1'$ and the other end of the transmission line 12. An inductor 52 represents a leakage reactance of the secondary winding 18CA and typically has a small value, for example, approximately 5%. Therefore, a short circuit of the secondary winding 18CA (for example thyristors 43A and 43B turned on simultaneously with thyristors 47A and 47B, or thyristors 41A and 41B turned on simultaneously with thyristors 45A and 45B) will result in an unacceptable high current, for example, approximately 20 times the full-load value. To avoid large short-circuit currents, the thyristors should be gated or turned on at the appropriate instance of time.

Figure 8A:
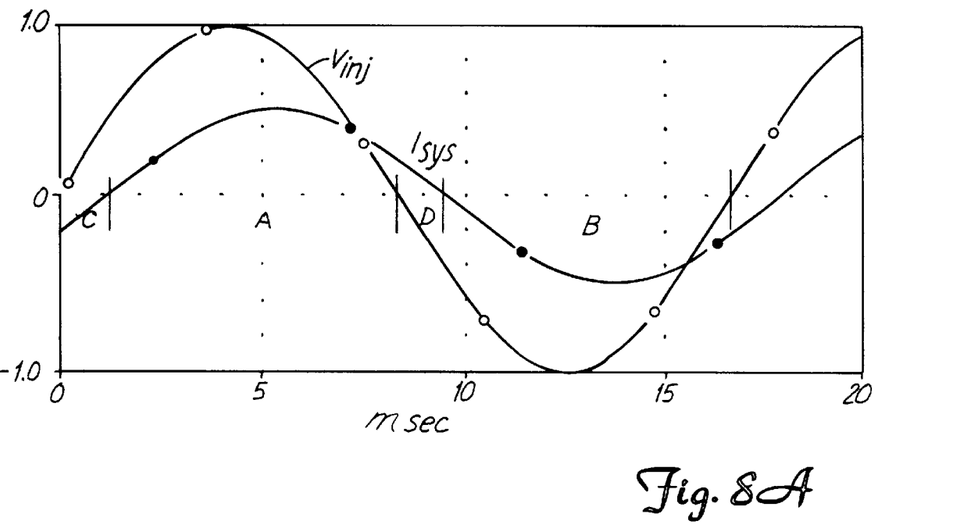
FIG. 8A is a graph illustrating an injected voltage leading a system current.
Figure 8B:
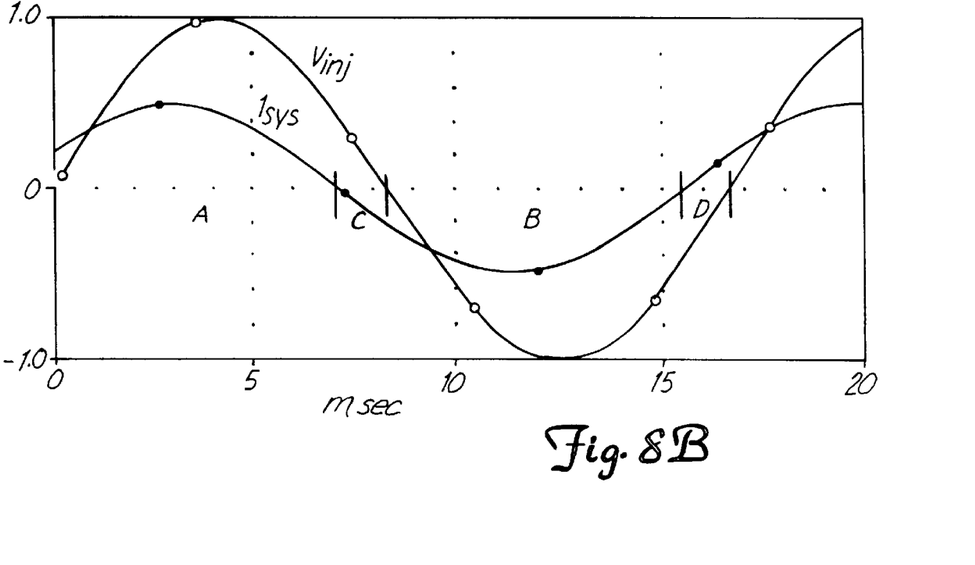
FIG. 8B is a graph illustrating an injected voltage lagging a system current.

FIG. 8A illustrates $i_{sys}$ lagging $v_{inj}$, while FIG. 8B illustrates $i_{sys}$ leading $v_{inj}$. During each cycle in both cases of FIGS. 8A and 8B, the following signs are present for $v_{inj}$ and $i_{sys}$:

Interval A $v_{inj}$=+, $i_{sys}$=+
Interval B $v_{inj}$=−, $i_{sys}$=−
Interval C $v_{inj}$=+, $i_{sys}$=−
Interval D $v_{inj}$=−, $i_{sys}$=+

Periodically, it is desirable to reverse the polarity of the injected voltage $v_{inj}$ or bypass it in order to obtain a new operating point for $E_1'$. The following description illustrates how this can be done. Assuming that the current $i_{sys}$ is initially flowing through the thyristors 43A, 43B, 45A and 45B, the objective is to transfer (or commutate) the current $i_{sys}$ to thyristors 41A, 41B, 47A and 47B, thus reversing the polarity of the injected voltage $v_{inj}$. When the current $i_{sys}$ is positive, it is flowing through thyristors 43A and 45A. Likewise, when the current $i_{sys}$ is negative, it is flowing through thyristors 43B and 45B. During the Interval D, when the injected voltage $v_{inj}$ is negative, the thyristors 41A and 47A are gated on. At the same time, gate pulses for the thyristors 43A, 43B, 45A and 45B are removed. The current $i_{sys}$ will then commutate to thyristors 41A and 47A. The commutation interval will depend on the voltage $v_{inj}$, the current $i_{sys}$ and the leakage reactance $X_L$. Current commutation, without a large short-circuit current, will be successful provided the commutation is completed before the end of the Interval D in FIGS. 8A and 8B. Once the commutation is complete, the thyristors 41B and 47B can also be supplied gate pulses. Based on similar control techniques, the thyristors 41A–47B can be gated for reversing back the polarity of the injected voltage $v_{inj}$, or for bypassing the secondary winding 18CA.

As discussed above, the available commutation interval depends on the phase relationship between $v_{inj}$ and $i_{sys}$. However, this interval is not easily predictable and can change instantly due to the interaction from the switching actions in the other secondary windings 18AB and 18BC. Accordingly, proper gating of the thyristors 41A–47B is complex and requires various circuit quantities to be measured.

Figure 9:
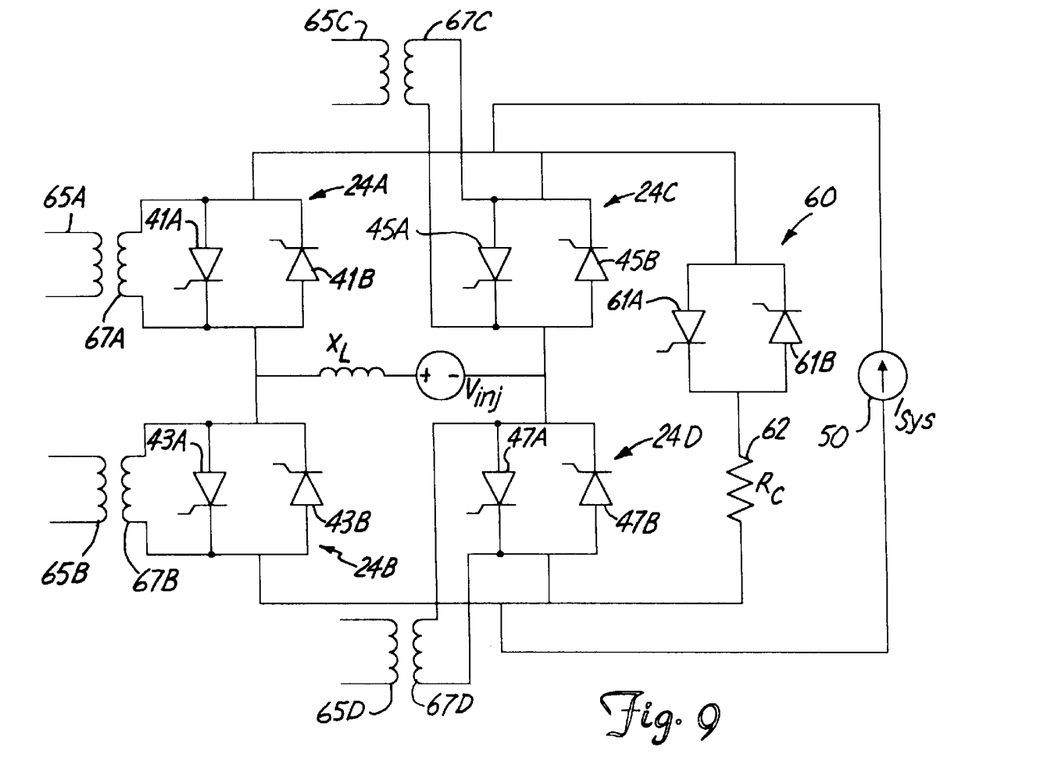
FIG. 9 is a circuit diagram for selectively connecting one secondary winding.

FIG. 9 illustrates a current limiting circuit 60 that limits the current flowing during commutation, thus avoiding large short-circuit currents. The current limiting circuit 60 includes anti-parallel connected thyristors 61A and 61B connected in series with a resistor 62. Typically, the thyristors 61A and 61B each comprise a plurality of series-connected thyristors in order to handle the required voltage. Generally, current commutation first begins with diverting the system current $i_{sys}$ to the current limiting circuit 60. Once all of the system current $i_{sys}$ is flowing through the current limiting circuit 60 and no current is flowing through any of the thyristors 41A–47B, gate pulses are provided to the intended pair of anti-parallel thyristors to form the polarity of the desired injected voltage $v_{inj}$. Current flow is then diverted away from the current limiting circuit 60. This technique limits the current during commutation to a value approximately equal to $v_{inj}/R_c$. By properly selecting $R_c$, the current during commutation can be limited to an acceptable value.

An example of current commutation using the circuit of FIG. 9 is provided below. Initially, the thyristors 43A, 43B, 45A and 45B are assumed to be gated to allow the current $i_{sys}$ to flow. To reverse the polarity of the injected voltage $v_{inj}$, the current is first transferred to the current limiting circuit 60 by removing the gate pulses from thyristors 43A, 43B, 45A and 45B, and simultaneously providing gate pulses to thyristors 61A and 61B. Conduction of thyristors 61A and 61B represents a "controlled short circuit" on the secondary winding 18CA, which is providing the voltage $v_{inj}$. The value of the resistor 62 is chosen such that the short-circuit current for less than one cycle is limited to two or three times the rated current. Once thyristors 43A, 43B, 45A and 45B have stopped conducting (as monitored by an increase in voltage across the thyristors 43A, 43B, 45A and 45B) then thyristors 41A, 41B, 47A and 47B are gated simultaneously with removal of the gate pulses from thyristors 61A and 61B. Within a cycle, the system current $i_{sys}$ will flow through the thyristors 41A, 41B, 47A and 47B, while the thyristors 61A and 61B will stop conducting. The current limiting circuit 60 and the above-described procedure ensures that a direct short-circuit of the voltage $v_{inj}$ through only the leakage inductance $X_L$ does not occur. This method of current commutation is particularly advantageous since each pair of anti-parallel thyristors 41A–47B, 61A and 61B can be controlled (gated or ungated) simultaneously.

Referring also to FIG. 1, the controller 25 receives input signals 65 indicative of the conducting state of each pair of anti-parallel thyristors 41A–47B of each secondary winding 18AB, 18BC and 18CA. In the embodiment illustrated, potential transformers 67A, 67B, 67C and 67D provide the input signals representative of the voltage across each pair of the anti-parallel thyristors 41A–47B.

Figure 10:
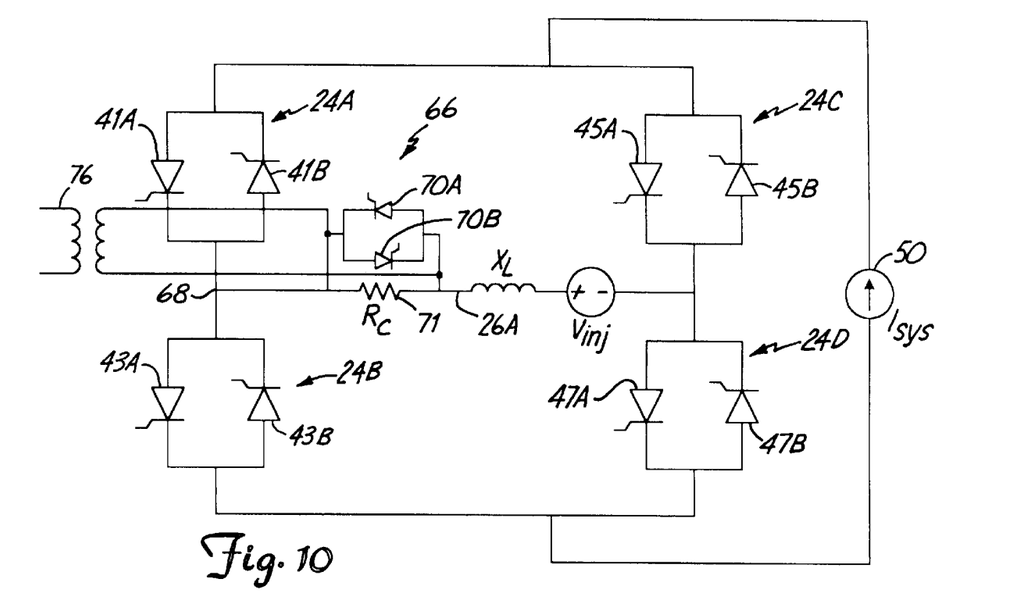
FIG. 10 is a second circuit diagram for selectively connecting one secondary winding.

FIG. 10 illustrates a second embodiment of a current limiting circuit 66 used during current commutation. The current limiting circuit 66 is connected in series between a common node 68 formed between the thyristors 41A, 41B, 43A and 43B, and the first end 26A of the secondary winding 18CA. The current commutation circuit 66 includes a resistor 71 connected in parallel with anti-parallel thyristors 70A and 70B. Under normal operation, the system current $i_{sys}$ flows through the anti-parallel thyristors 70A and 70B. To reverse the polarity of the injected voltage $v_{inj}$, the gate pulses to thyristors 70A and 70B are first removed to ensure that the system current $i_{sys}$ is flowing through resistor 71 before communication begins. The gate pulses are then provided to the intended pair of anti-parallel thyristors, for example, thyristors 41A, 41B, 47A and 47B, while gate pulses to the presently conducting thyristors, for example, thyristors 43A, 43B, 45A and 45B, are removed. The resistor 71 limits the system current $i_{sys}$ during commutation. A potential transformer 76 monitors the voltage across the thyristors 70A and 70B and provides an output signal to the controller 25 to ensure that the system current $i_{sys}$ is flowing through the resistor 71 before commutation begins. The potential transformers 67A–67D are provided as illustrated in FIG. 9 to monitor the conducting state of the thyristors 41A–47B.

Figure 11:
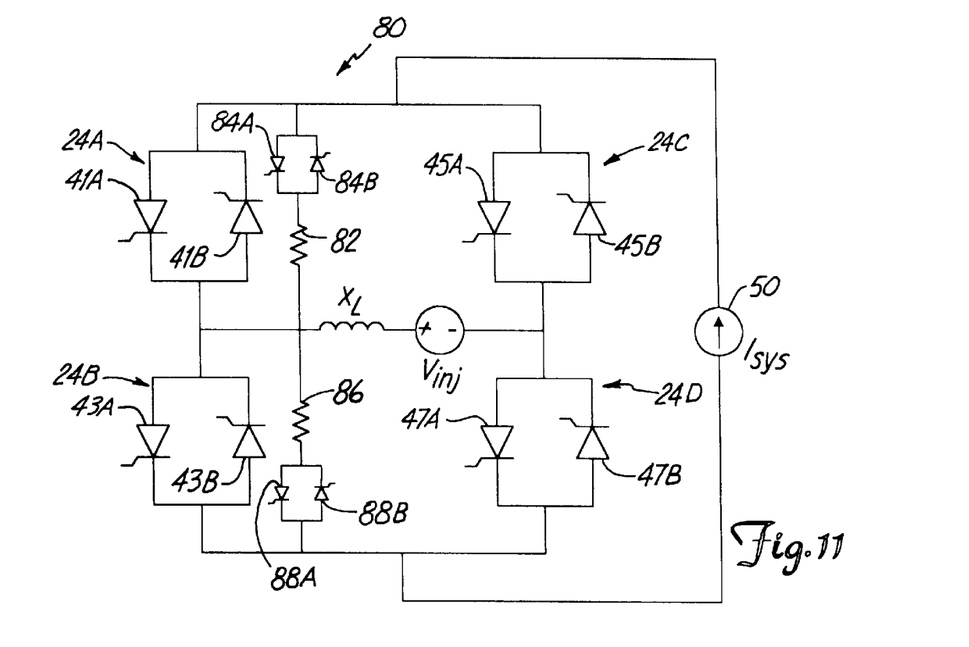
FIG. 11 is a third circuit diagram for selectively connecting one secondary winding.

Some transients can result in large DC (offset) current components which decay according to a L/R time constant of the transmission line 12 when the secondary windings 18AB, 18BC and 18CA are injected or bypassed. The time constant is usually very large since the resistance R of the transmission line 12 is intentionally minimized to avoid power losses. FIG. 11 illustrates a current limiting circuit 80 that also provides some damping of the DC (offset) current components due to current commutation.

The current limiting circuit 80 includes a resistor 82 connected in series with anti-parallel thyristors 84A and 84B. The resistor 82 and the thyristors 84A and 84B are connected in parallel with the thyristors 41A and 41B The current limiting circuit 80 further includes a resistor 86 connected in series with anti-parallel thyristors 88A and 88B. The series-connected resistor 86 and thyristors 88A and 88B are connected in parallel with the thyristors 43A and 43B.

An example of current commutation using the current limiting circuit 80 follows below. Initially, the system current $i_{sys}$ is flowing through the thyristors 43A, 43B, 45A and 45B. To reverse the polarity of the injected voltage $v_{inj}$, the thyristors 84A, 84B, 88A and 88B are gated and the gate pulses of thyristors 43A and 43B are removed. In this state, the system current $i_{sys}$ flows through the thyristors 45A and 45B, the resistor 86 and through the thyristors 88A and 88B. The gate pulses to the thyristors 45A and 45B are then removed while simultaneously providing gate pulses to the thyristors 47A and 47B. This reverses the polarity of the injected $v_{inj}$ wherein the system current $i_{sys}$ now flows through the thyristors 84A and 84B, the resistor 82 and the thyristors 47A and 47B. The resistor 82 is kept in the path of the system current $i_{sys}$ for a few tens of milliseconds in order to damp out the current transients. The resistor 82 is then bypassed by providing gate pulses to the thyristors 41A and 41B at which time the gate pulses to the thyristors 84A and 84B can be removed. The potential transformers 67A–67D are provided as illustrated in FIG. 9 to monitor the conducting state of the thyristors 41A–47B.

Figure 12:
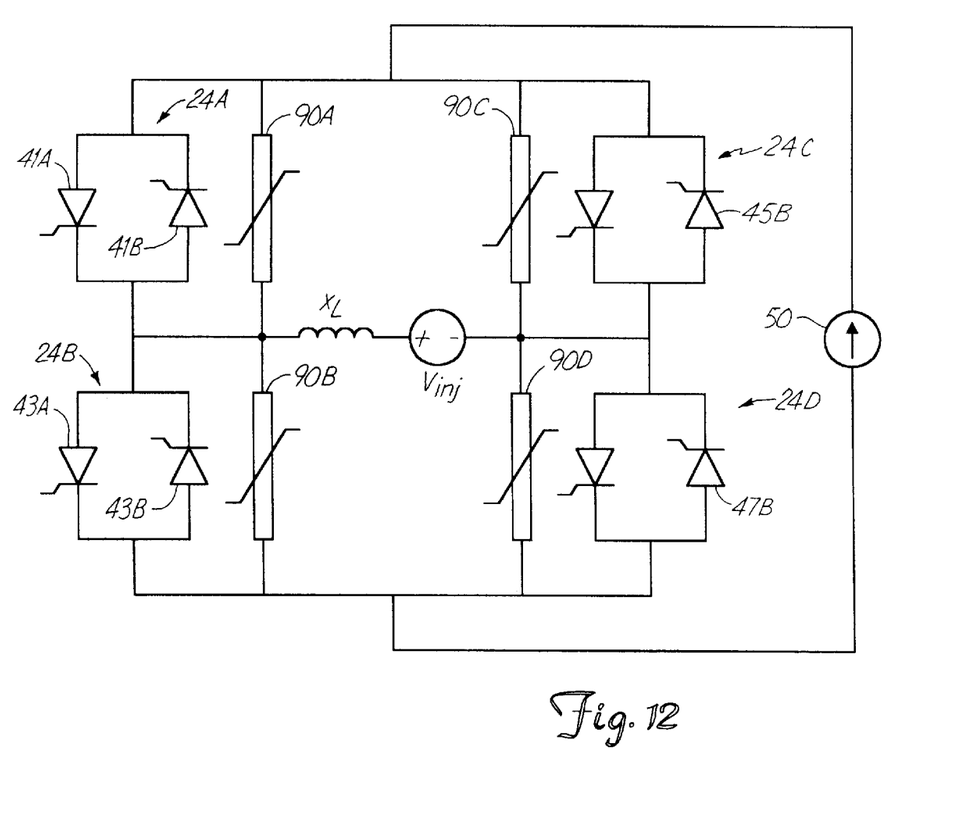
FIG. 12 is a fourth circuit diagram for selectively connecting one secondary winding.

FIG. 12 illustrates yet another embodiment for limiting current during current commutation and providing damping. In this embodiment, arresters 90A, 90B, 90C and 90C are provided as illustrated across each pair of the anti-parallel thyristors 41A–47B, respectively. The arresters 90A–90D may be required to protect the thyristors 41A–47B from overvoltages, but in the embodiment of FIG. 12, the arresters 90A and 90D further provide damping during current commutation. For example, if the system current $i_{sys}$ was initially flowing through thyristors 43A, 43B, 45A and 45B, and the polarity of the injected voltage $v_{inj}$ is to be reversed, the gate pulses to the thyristors 43A, 43B, 45A and 45B are first removed. Within one-half cycle, the system current $i_{sys}$ (if positive) will be forced to flow through the arrestors 90C and 90B if the injected voltage $v_{inj}$ is positive, or through the arrestors 90A and 90D if the injected voltage $v_{inj}$ is negative. The opposite will be true if the system current $i_{sys}$ is negative. The maximum voltages across the thyristors 41A–47B will be clamped to slightly above the operating voltages and the nonlinear resistance of the arrestors 90A–90D will quickly damp out the current transients. Subsequently, gate pulses are provided to the thyristors 41A, 41B, 47A and 47B in order to conduct the system current $i_{sys}$ and reverse the polarity of the injected voltage $v_{inj}$.

Figure 13:
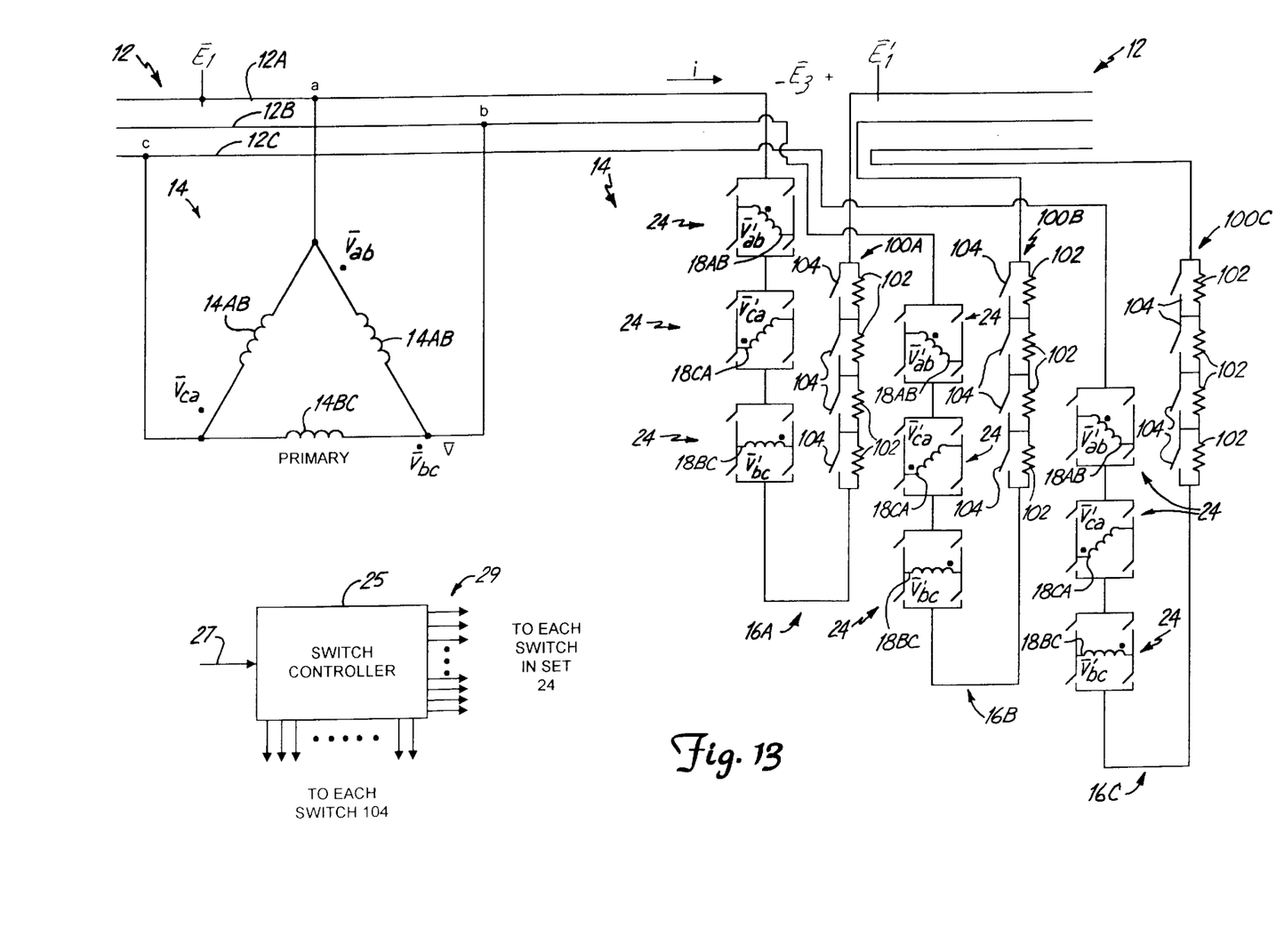
FIG. 13 is a circuit diagram illustrating a fifth embodiment of the present invention.

In a further preferred embodiment illustrated in FIG. 13, each plurality of secondary windings 16A–16C includes line damping assemblies 100A, 100B and 100C, respectively. The line damping assemblies 100A–100C are connected in series with the secondary windings 18AB, 18BC and 18CA of the plurality of secondary windings 16A–16C, respectively. Each of the damping assemblies 100A–100C includes at least one, and preferably, a plurality of series connected resistors 102. Each of the resistors 102 includes a corresponding switching element 104 that can selectively connect the corresponding resistor 102 in series in each of the transmission line conductors 12A, 12B or 12C. Specifically, when a particular switching device 104 is open and not conducting current, current flows through the corresponding resistor 102. Likewise, when a particular switching device 104 is closed, the corresponding resistor 102 is shorted out. The switching devices 104 can comprise a mechanical switch or any suitable electronic power flow controlling device such as anti-parallel thyristors. The switch controller 25 operates the switching devices 104 of each line damping circuit 100A–100C in order to provide additional damping on the transmission line conductors 12A–12C in addition to or in place of any damping provided in commutation circuits described above that switch the individual secondary windings 18AB, 18BC or 18CA.

Although the present invention has been described with reference to preferred embodiments, workers skilled in the art will recognize that changes may be made in form and detail without departing from the spirit and scope of the invention.

What is claimed is:

1. A multi-phase power transfer controller for a multi-phase transmission line, the multi-phase power transfer controller comprising:
   a set of primary windings comprising:
      a first primary winding connectable to a first line of the multi-phase transmission line;
      a second primary winding connectable to a second line of the multi-phase transmission line and connected to the first primary winding;
      a third primary winding connectable to a third line of the multi-phase transmission line and connected to the second primary winding;
   a set of secondary windings comprising:
      a first plurality of secondary windings connectable in series with a first line of the transmission line;
      a second plurality of secondary windings connectable in series with a second line of the transmission line;
      a third plurality of secondary windings connectable in series with a third line of the transmission line; and
      wherein each plurality of secondary windings comprises a first secondary winding magnetically linked to the first primary winding; a second secondary winding magnetically linked to the second primary winding; and a third secondary winding magnetically linked to the third primary winding; and
   a switching assembly for selectively connecting the secondary windings of each plurality of secondary windings in series in each corresponding transmission line.

2. The multi-phase power transfer controller of claim 1 wherein the switching assembly selectively bypasses and connects each secondary winding in forward and in reverse polarity with each corresponding primary winding.

3. The multi-phase power transfer controller of claim 2 wherein the switching assembly comprises a plurality of four switching devices for each secondary winding wherein a first switching device selectively connects a first end of the secondary winding to a first end of the corresponding transmission line, a second switching device selectively connects the first end of the secondary winding to a second end of the corresponding transmission line, a third switching device selectively connects a second end of the secondary winding to the first end of the transmission line and a fourth switching device selectively connects the second end of the secondary winding to the second end of the transmission line.

4. The multi-phase power transfer controller of claim 3 wherein each switching device comprises an electronic power flow switching element.

5. The multi-phase power transfer controller of claim 4 and further comprising a switch controller operably connected to each switching device to selectively actuate each switching device.

6. The multi-phase power transfer controller of claim 5 and further comprising a current limiting circuit for each secondary winding to limit current through each corresponding secondary winding.

7. The multi-phase power transfer controller of claim 6 wherein each current limiting circuit comprises a damping resistor selectively connected across the first end of the transmission line and the second end of the transmission line.

8. The multi-phase power transfer controller of claim 6 wherein each current limiting circuit comprises a damping resistor selectively connected in series with each secondary winding.

9. The multi-phase power transfer controller of claim 6 wherein the current limiting circuit comprises an arrester connected in parallel with each switching device.

10. The multi-phase power transfer controller of claim 5 wherein current limiting circuit comprises a damping resistor assembly selectively connected in series in transmission line, the damping resistor assembly comprising a plurality of resistors selectively connected in series.

11. The multi-phase power transfer controller of claim 4 wherein each switching device comprises anti-parallel connected thyristors.

12. The multi-phase power transfer controller of claim 1 and further comprising:
   a second set of secondary windings magnetically linked to the set of primary windings; and
   a static var compensator operably connected to the second set of secondary windings.

13. The multi-phase power transfer controller of claim 1 wherein the set of secondary windings include:
   a fourth plurality of secondary windings connectable in series with the first line of the transmission line;
   a fifth plurality of secondary windings connectable in series with the second line of the transmission line;
   a sixth plurality of secondary windings connectable in series with the third line of the transmission line; and
   wherein the fourth, fifth and sixth plurality of secondary windings comprises a first secondary winding magnetically linked to the first primary winding; a second secondary winding magnetically linked to the second primary winding; and a third secondary winding magnetically linked to the third primary winding;
and wherein the switching assembly further selectively connects the secondary windings of the fourth, fifth and sixth plurality of secondary windings in series in each corresponding transmission line.

14. The multi-phase power transfer controller of claim 1 and further comprising:
   a second set of secondary windings magnetically linked to the set of primary windings; and
   wherein the primary windings and the second set of secondary windings comprise a transformer for the transmission line.

15. The multi-phase power transfer controller of claim 1 wherein the switching assembly selectively connects an equal number of secondary windings of each plurality of secondary windings in series in each corresponding line of the multi-phase transmission line to provide selected voltages on the multi-phase transmission line.

16. The multi-phase power transfer controller of claim 1 wherein the switching assembly selectively connects a non-equal number of secondary windings of each plurality of secondary windings in series in each corresponding line of the multi-phase transmission line to provide selected voltages on the multi-phase transmission line.

17. A method of controlling power transferred in a multi-phase transmission line, the method comprising the steps of:

generating a first plurality of in phase time-varying voltages, a second plurality of in phase time-varying voltages displaced in phase from the first plurality of voltages, and a third plurality of in phase time-varying voltages displaced in phase from the first and second plurality of voltages; and connecting the first, second and third plurality of voltages in series selectively in each line of the multi-phase transmission line.

18. The method of claim 17 wherein the step of generating comprises providing, a set of primary windings comprising:
a first primary winding connected to a first line of the multi-phase transmission line;
a second primary winding connected to a second line of the multi-phase transmission line;
a third primary winding connected to a third line of the multi-phase transmission line; and a set of secondary windings comprising:
a first plurality of secondary windings connectable in series with a first line of the transmission line;
a second plurality of secondary windings connectable in series with a second line of the transmission line;
a third plurality of secondary windings connectable in series with a third line of the transmission line; and
wherein each plurality of secondary windings comprises a first secondary winding magnetically linked to the first primary winding; a second secondary winding magnetically linked to the second primary winding; and a third secondary winding magnetically linked to the third primary winding;

and wherein the step of connecting comprises selectively connecting the secondary windings of each plurality of secondary windings in series in each corresponding transmission line.

19. The method of claim 18 wherein the step of connecting selectively bypasses and connects each secondary winding in forward and in reverse polarity with each corresponding primary winding.

20. The method of claim 18 wherein the step of connecting includes limiting a current through each secondary winding to be connected in series in each corresponding transmission line during a time duration of connecting the said secondary winding in the corresponding transmission line.

21. The method of claim 20 wherein the step of connecting includes connecting a resistor in series with said corresponding secondary winding during the time duration.

22. The method of claim 18 wherein the step of connecting includes diverting a current from each secondary winding to be connected in series in each corresponding transmission line through current limiting circuit during a time duration of connecting said secondary winding in the corresponding transmission line.

23. The method of claim 22 wherein the current limiting circuit includes a resistor.

24. The method of claim 17 wherein the step of connecting includes selectively connecting an equal number of secondary windings of each plurality of secondary windings in series in each corresponding line of the multi-phase transmission line to provide a selected voltages on the multi-phase transmission line.

25. The method of claim 17 wherein the step of connecting includes selectively connecting a non-equal number of secondary windings of each plurality of secondary windings in series in each corresponding line of the multi-phase transmission line to provide a selected voltages on the multi-phase transmission line.

* * * * *

UNITED STATES PATENT AND TRADEMARK OFFICE
CERTIFICATE OF CORRECTION

PATENT NO. : 5,818,126
DATED : October 6, 1998
INVENTOR(S) : Mohan

It is certified that error appears in the above-identified patent and that said Letters Patent is hereby corrected as shown below:

On the title page, Item

[56] References Cited

OTHER PUBLICATIONS

Second listed publication, replace "1-1-702" with --1-1 - 7-2--.

Signed and Sealed this

Sixteenth Day of March, 1999

Attest:

Attesting Officer

Q. TODD DICKINSON

Acting Commissioner of Patents and Trademarks